US008888132B2

(12) United States Patent
Allen

(10) Patent No.: US 8,888,132 B2
(45) Date of Patent: Nov. 18, 2014

(54) SEALING ASSEMBLY

(71) Applicant: GM Global Technology Operations LLC, Detroit, MI (US)

(72) Inventor: Todd E. Allen, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 13/647,473

(22) Filed: Oct. 9, 2012

(65) Prior Publication Data

US 2014/0099049 A1    Apr. 10, 2014

(51) Int. Cl.
  *B62D 1/18*     (2006.01)
  *F16C 1/28*     (2006.01)
  *F16J 15/52*    (2006.01)

(52) U.S. Cl.
  USPC .......................... 280/779; 277/634; 464/173

(58) Field of Classification Search
  USPC ............ 280/779; 74/492; 277/630, 634–638, 277/640, 641, 644, 654; 464/173
  See application file for complete search history.

(56) References Cited

U.S. PATENT DOCUMENTS

| | | | | |
|---|---|---|---|---|
| 2,797,955 A * | 7/1957 | Wilfert | ........................ | 296/1.06 |
| 4,165,105 A * | 8/1979 | Hahn | .............................. | 285/19 |
| 4,186,945 A * | 2/1980 | Hahn | .............................. | 285/19 |
| 4,286,506 A * | 9/1981 | Yanagida | ...................... | 454/154 |
| 4,826,466 A * | 5/1989 | Triquet | ........................ | 464/173 |
| 4,895,391 A * | 1/1990 | Groat | ........................... | 280/779 |
| 6,056,297 A * | 5/2000 | Harkrader et al. | ............ | 277/634 |
| 7,097,568 B2 * | 8/2006 | Kuczera et al. | ............... | 464/173 |
| 7,407,442 B2 * | 8/2008 | Terashima | .................... | 464/173 |
| 7,549,503 B2 * | 6/2009 | Kanayama et al. | ........... | 180/443 |
| 7,641,561 B2 * | 1/2010 | Moriyama et al. | ............ | 464/173 |
| 8,469,399 B2 * | 6/2013 | Allen | ............................ | 280/779 |

* cited by examiner

*Primary Examiner* — Paul N Dickson
*Assistant Examiner* — Barry Gooden, Jr.
(74) *Attorney, Agent, or Firm* — Quinn Law Group, PLLC

(57) ABSTRACT

An apparatus includes a first panel having a first side and a second side and defining a first hole. The apparatus also includes a second panel having a third side and a fourth side and defining a second hole. A seal assembly extends from the first panel to the second panel and through the first and second holes. The seal assembly includes a first wall that defines a passageway from the first hole to the second hole, and a second wall that surrounds the first wall and cooperates with the first wall to define a chamber therebetween. The seal assembly forms a first seal around the first hole and a second seal around the second hole.

8 Claims, 2 Drawing Sheets

SEALING ASSEMBLY

TECHNICAL FIELD

This invention relates to seals that seal holes in panels having shafts extending therethrough.

BACKGROUND

A motor vehicle typically includes a dash panel, or bulkhead, that separates the passenger compartment from an engine compartment. A steering shaft passes through a hole in the dash panel to connect the steering wheel, which is in the passenger compartment, to the steering gear, which is in the engine compartment. A seal is typically employed between the dash panel and the shaft to prevent noise, gases, water, and debris from entering the passenger compartment from the engine compartment via the hole in the dash panel. In some vehicles, the passenger compartment and the engine compartment are separated by two panels having a space therebetween.

SUMMARY

An apparatus includes a first panel having a first side and a second side and defining a first hole. The apparatus also includes a second panel having a third side and a fourth side and defining a second hole. A seal assembly extends from the first panel to the second panel and through the first and second holes. The seal assembly includes a first wall that defines a passageway from the first hole to the second hole, and a second wall that surrounds the first wall and cooperates with the first wall to define a chamber therebetween. The seal assembly forms a first seal around the first hole and a second seal around the second hole.

The apparatus provided enables a shaft to extend through both the first and second panels, while sealing the first and second holes to reduce or eliminate the transmission of debris, water, or sound from the space between the panels through the holes. The two walls and the chamber therebetween provide effective sound insulation.

A corresponding seal assembly is also provided.

The above features and advantages and other features and advantages of the present invention are readily apparent from the following detailed description of the best modes for carrying out the invention when taken in connection with the accompanying drawings.

DETAILED DESCRIPTION

Figure 1:
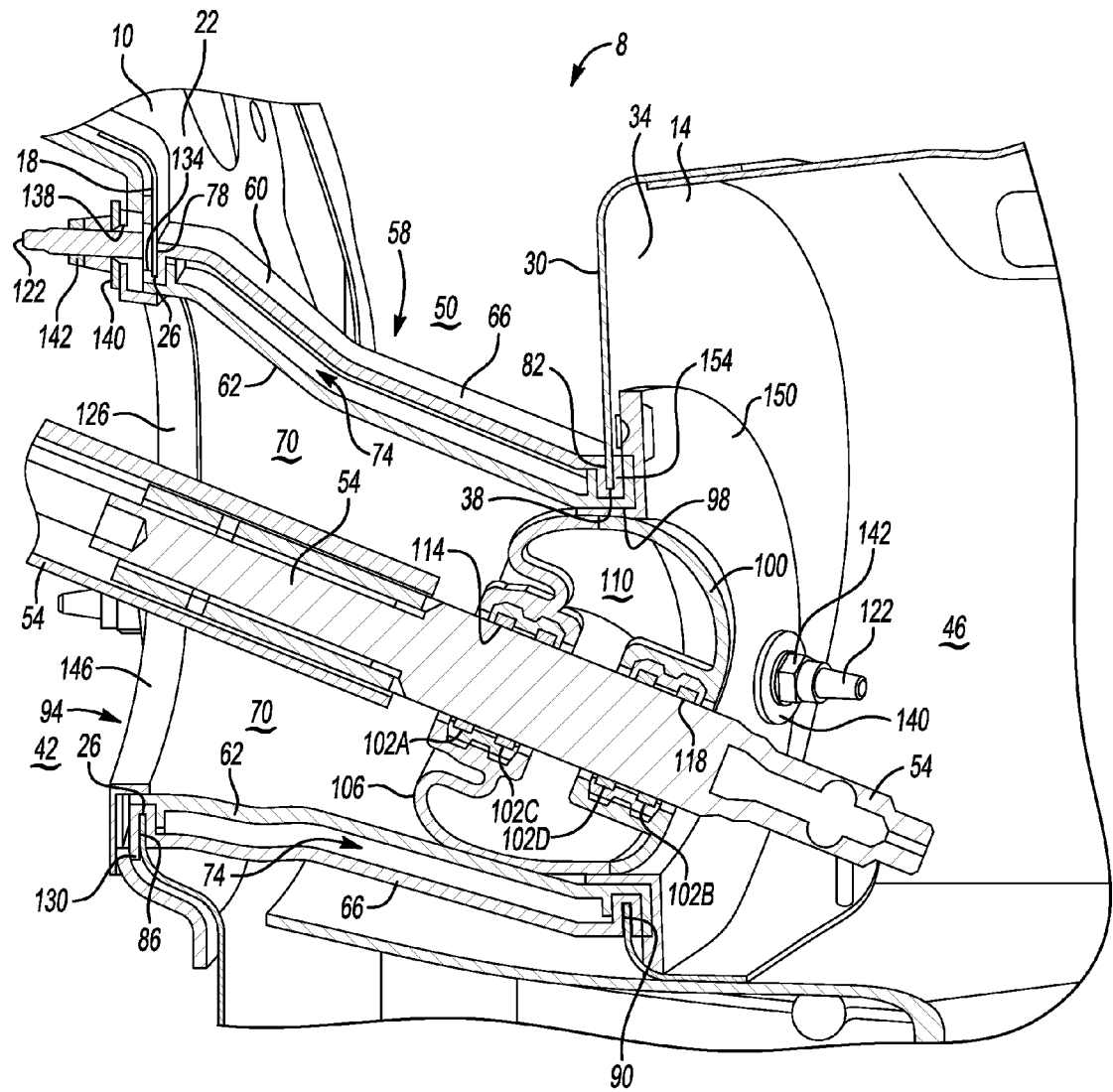
FIG. 1 is a schematic, perspective, cross-sectional, side view of a seal assembly that seals two holes in two panel assemblies, and a steering shaft extending therethrough.

Referring to FIG. 1, a vehicle 8 includes a first panel 10 and a second panel 14. The first panel 10 has a first side 18 and a second side 22 and defines a first hole 26. The second panel 14 has a third side 30 and a fourth side 34 and defines a second hole 38. In the embodiment depicted, the first side 18 of first panel 10 partially defines a passenger compartment 42, and the fourth side 34 of the second panel 14 partially defines an engine compartment 46.

The first and second panels 10, 14 are spaced apart from one another such that the second side 22 of the first panel 10 and the third side 30 of the second panel 14 define an open space 50 therebetween. Thus, the panels 10, 14 and the open space 50 isolate the passenger compartment 42 from the engine compartment 46. The first and second holes 26, 38 enable a steering shaft 54 to extend from a steering wheel (not shown) in the passenger compartment 42, through the open space 50, and to a steering mechanism (not shown) in the engine compartment 46.

A seal assembly 58 includes a first subassembly 60 that extends between the first panel 10 and the second panel 14. The first subassembly 60 includes a first wall 62 and a second wall 66. The first wall 62 defines a passageway 70 from the passenger compartment 42 to the engine compartment 46. The second wall 66 surrounds the first wall 62 and cooperates with the first wall to define a first chamber 74 therebetween. The first subassembly 60 forms a first seal 78 around the first hole 26 and a second seal 82 around the second hole 38.

More specifically, in the embodiment depicted, the first subassembly 58 defines a first groove 86 and a second groove 90. The portion of the first panel 10 around the first hole 26 extends into the first groove 86. Contact between the seal assembly 58 and the first panel 10 inside the first groove 86 creates the first seal 78. The portion of the second panel 14 around the second hole 38 extends into the second groove 90. Contact between the seal assembly 58 and the second panel 14 inside the second groove 90 creates the second seal 82. The first seal 78 completely surrounds the first hole 26, thereby sealing the passenger compartment 42 from the open space 50. The second seal 82 completely surrounds the second hole 38, thereby sealing the open space 50 from the engine compartment 46. In the embodiment depicted, the first and second holes 26, 38 are circular, and the first and second grooves 86, 90 are annular.

The passageway 70 has an opening 94 in the passenger compartment 42 and another opening 98 in the engine compartment 46. In the embodiment depicted, passageway 70 has no other openings other than openings 94 and 98. The seal assembly 58 thus forms a boot around the shaft 54.

The seal assembly 58 includes a second subassembly 100. The second subassembly 100 includes at least one bushing, which may also be referred to herein as a bearing. In the embodiment depicted, the second subassembly 100 includes four bushings, namely a first bushing 102A, a second bushing 102B, a third bushing 102C, and fourth bushing 102D. The subassembly 100 includes a bearing support 106, which supports the bushings 102A-D inside the passageway 70. The steering shaft 54 extends through the first hole 26, the passageway 70, the four bushings 102A-D, and the second hole 38. The bearing support 106, the bushings 102A-D, and the shaft 54 cooperate to completely obstruct the passageway 70 (the support 106 extends radially outward from the bushings 102A-D to contact the first wall 62), thereby minimizing or eliminating transmission of noise, debris, and water from the engine compartment 46 to the passenger compartment 42 through the passageway 70.

The bearing support 106 in the embodiment depicted defines a second chamber 110 having only two openings 114, 118. The first bushing 102A defines the first opening 114, and the second bushing 102B defines the second opening 118. Bushings 102A-D are low-friction O-rings that sealingly contact the shaft 54. In the embodiment depicted, the walls 62, 66 and the bearing support 106 are comprised of an elastomeric material.

Figure 3:
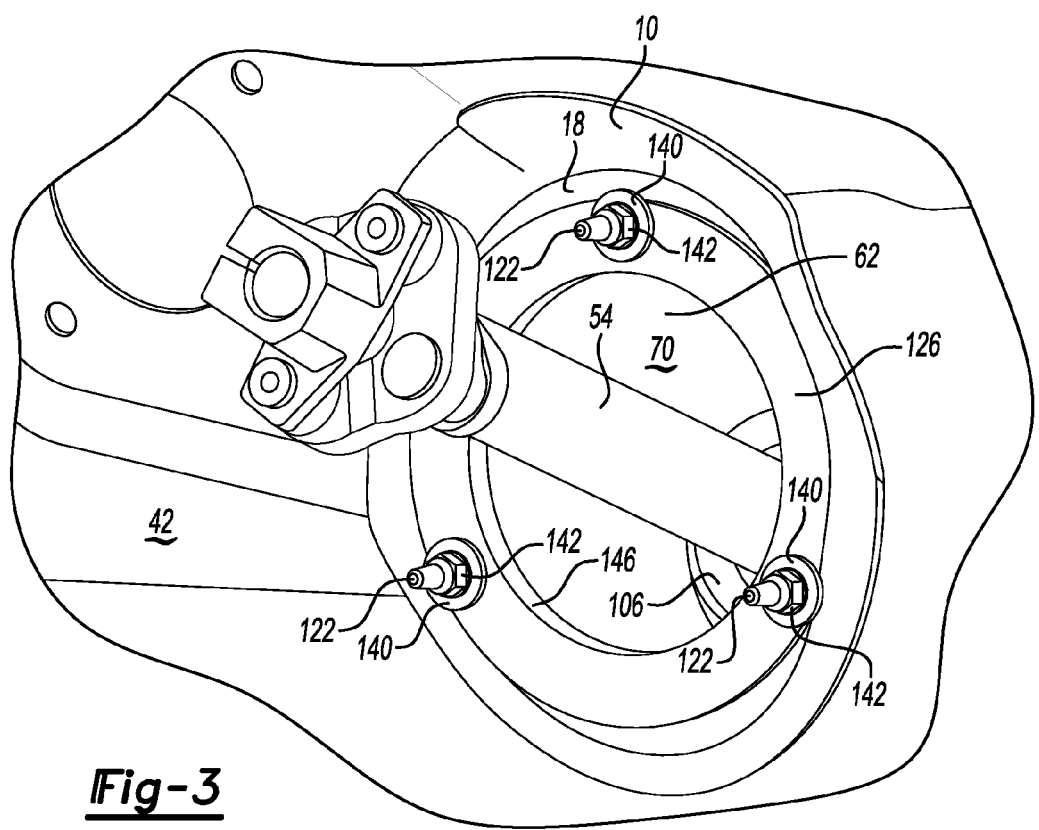
FIG. 3 is a schematic, rear view of the seal assembly of FIG. 1.

Referring to FIGS. 1 and 3, the seal assembly 58 is maintained in engagement with the first panel 10 by a plurality of threaded fasteners 122 and a close-out plate 126. The threaded fasteners 122 extend from the first side 18 of the first panel 10. In the embodiment depicted, the threaded fasteners 122 are studs that are welded to the first panel 10.

Referring specifically to FIG. 1, the seal assembly 58 includes a lip 130 that partially defines the first groove 86 and that is on the first side 18 of the first panel 10. The lip 130 defines a first aperture 134, and the threaded fastener 122 extends through the first aperture 134. The plate 126 defines a second aperture 138, and the threaded fastener 122 extends through the second aperture 138. A washer 140 contacts the plate 126, and a nut 142 is engaged with the threaded fastener 122 to retain the plate 126 to the threaded fastener. Only one of the threaded fasteners 122 is shown in FIG. 1; the other fasteners (shown in FIG. 3) extend through respective apertures in the lip 130 and plate, and are secured with respective nuts 142. The plate 126 defines a third hole 146, and the shaft 54 extends through the third hole 146.

Figure 2:
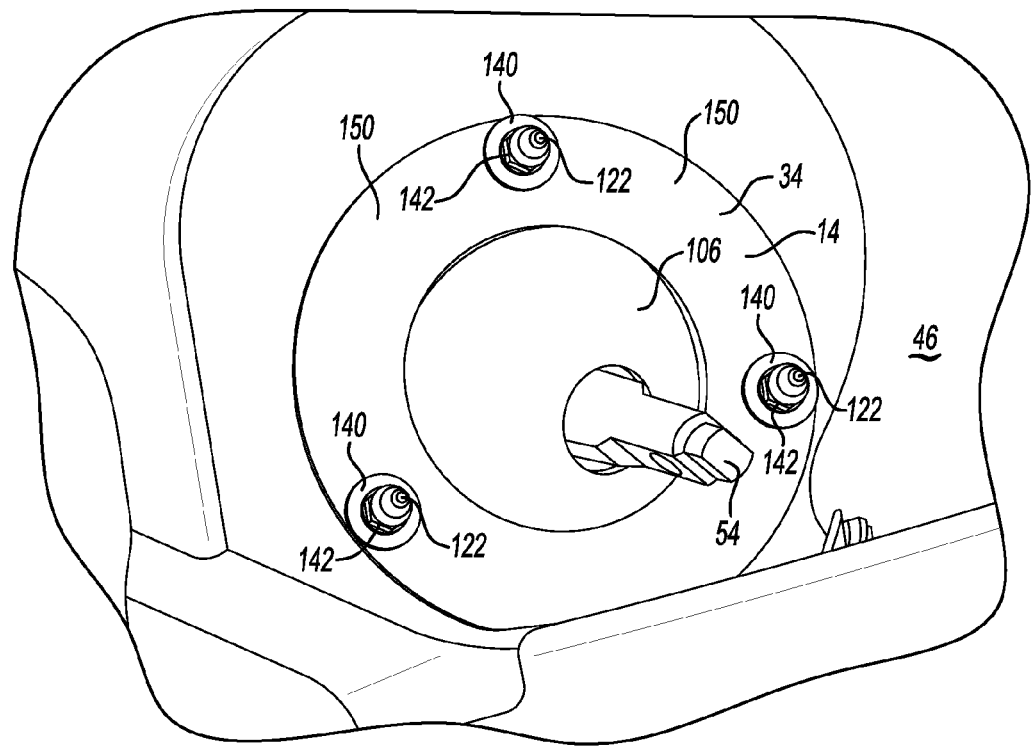
FIG. 2 is a schematic, front view of the seal assembly of FIG. 1.

Referring to FIGS. 1 and 2, the second subassembly 100 includes another plate 150 that is attached to the bearing support 106, and which functions in a manner similar to that of plate 126 to retain the seal assembly 58 with respect to the second panel. More specifically, fasteners 122 attached to the second panel 14 extend through apertures in lip 154 (which partially forms the second groove 90) and plate 150; washers 140 and nuts 142 are engaged with the fasteners 122.

Prior to vehicle assembly, the first and second subassemblies 60, 100 have not been connected to each other, and are separate units that are independently movable. During vehicle assembly, the first subassembly 60 is installed between the two panels 10, 14, with each panel 10, 14 extending into a respective one of the grooves 86, 90. The shaft 54 is slid through the chamber 110 and bushings 102A-D of the second subassembly 100. The second subassembly 100 and the shaft 54 are then inserted into the passageway 70 as shown to seal the passageway 70.

While the best modes for carrying out the invention have been described in detail, those familiar with the art to which this invention relates will recognize various alternative designs and embodiments for practicing the invention within the scope of the appended claims.

The invention claimed is:

1. An apparatus comprising:
a first panel defining a first hole;
a second panel spaced apart from the first panel and defining a second hole;
a seal assembly that extends from the first panel to the second panel, and includes a first wall that defines a passageway from the first hole to the second hole, and defines a first groove into which the first panel extends to form a first seal around the first hole and defines a second groove into which the second panel extends to form a second seal around the second hole; and
a rotatable shaft extending axially through the first hole, the passageway, and the second hole;
wherein the seal assembly includes two or more bushings disposed at least partially within the passageway and through which the shaft extends in sealing contact with the two or more bushings, a bearing support is disposed about the two or more bushings and extends radially to the first wall such that the bearing support, the two or more bushings, and the shaft cooperate to obstruct the passageway and minimize communication from the first hole to the second hole;
wherein a first bushing of the two or more bushings is disposed in a proximal side of the bearing support and a second bushing of the two or more bushings is disposed in a distal side of the bearing support spaced apart from the first panel and cooperating with the proximal side to define a closed chamber within the bearing support; and
a plate defining a plate opening fastened to the second panel with the plate opening aligned with the second hole and the passageway such that the plate is disposed about the shaft and directly engages the bearing support.

2. The apparatus of claim 1, wherein the seal assembly includes a second wall that surrounds the first wall and cooperates with the first wall to define another chamber therebetween.

3. The apparatus of claim 1, wherein the bearing support is configured such that the two or more bushings are movable relative to the first wall.

4. The apparatus of claim 1, wherein the bearing support comprises an elastomeric material.

5. The apparatus of claim 1, wherein the seal assembly includes a lip that partially defines the first groove.

6. The apparatus of claim 5, wherein the lip defines a first aperture and wherein a threaded fastener extends through the first aperture.

7. The apparatus of claim 6, further comprising a close-out plate defining a second aperture and wherein the threaded fastener extends through the second aperture.

8. The apparatus of claim 7, wherein the close-out plate defines a third hole and wherein the shaft extends through the third hole.

* * * * *